Feb. 28, 1928.
1,660,510

L. IVERSEN

ROLLER TABLE LINE SHAFT BEARING

Filed March 7, 1924  2 Sheets-Sheet 1

INVENTOR

Feb. 28, 1928.                                              1,660,510
                        L. IVERSEN
             ROLLER TABLE LINE SHAFT BEARING
                 Filed March 7, 1924        2 Sheets-Sheet 2
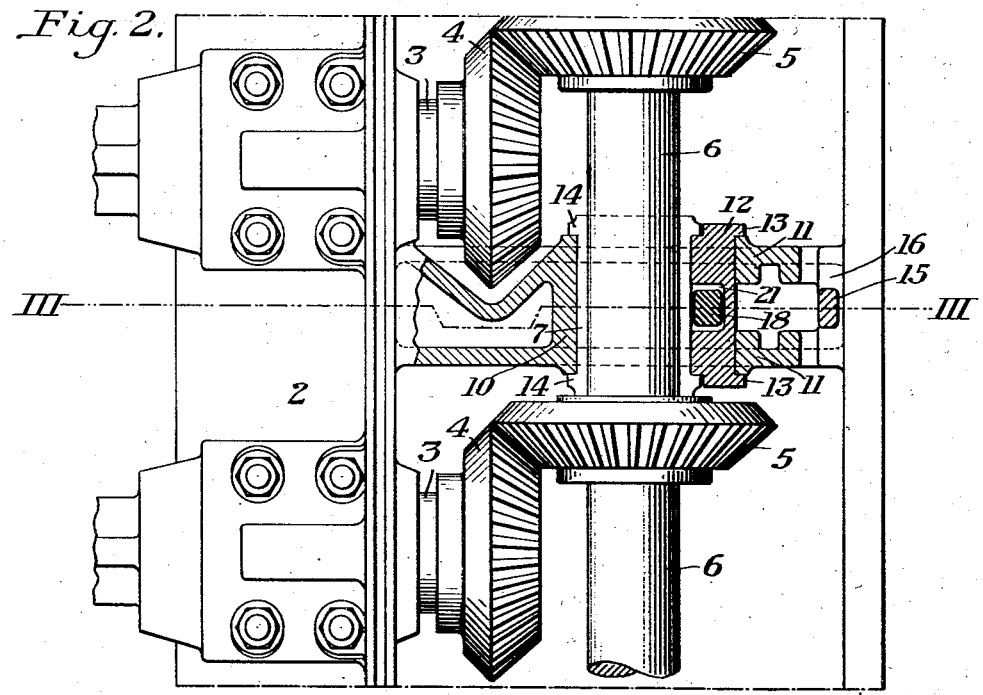
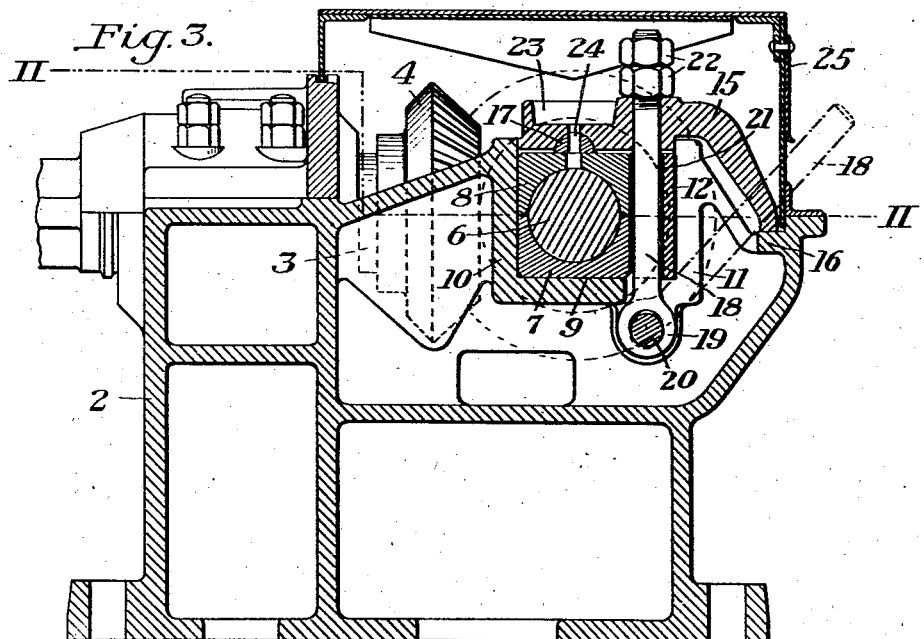
INVENTOR Patented Feb. 28, 1928.

1,660,510

UNITED STATES PATENT OFFICE.

LORENZ IVERSEN, OF PITTSBURGH, PENNSYLVANIA, ASSIGNOR TO MESTA MACHINE COMPANY, OF PITTSBURGH, PENNSYLVANIA, A CORPORATION OF PENNSYLVANIA.

ROLLER-TABLE-LINE SHAFT BEARING.

Application filed March 7, 1924. Serial No. 697,496.

The present invention relates broadly to shaft bearings, and more particularly to roller table line shaft bearings.

The purpose of the invention is to provide a mounting for the bearings of a power shaft which will permit the shaft to be readily shifted laterally in order to disconnect it from the driven element or elements.

The invention is particularly useful in connection with the line shaft of a roller table for rolling mills and is so illustrated in the accompanying drawings, in which:—

Figure 2 is a view similar to Figure 1, but showing certain of the parts in horizontal section, the section being taken on the line II—II of Figure 3;

Figure 3 is a vertical section on the line III—III of Figure 2, and

In the illustrated embodiment of the invention, 2 designates a table beam in which are journaled the necks 3 of rollers (not shown), these necks having the usual mitre gears 4 mounted thereon. Meshing with the mitre gears 4 are mitre gears 5 mounted upon the usual line or power shaft 6.

Figure 1:
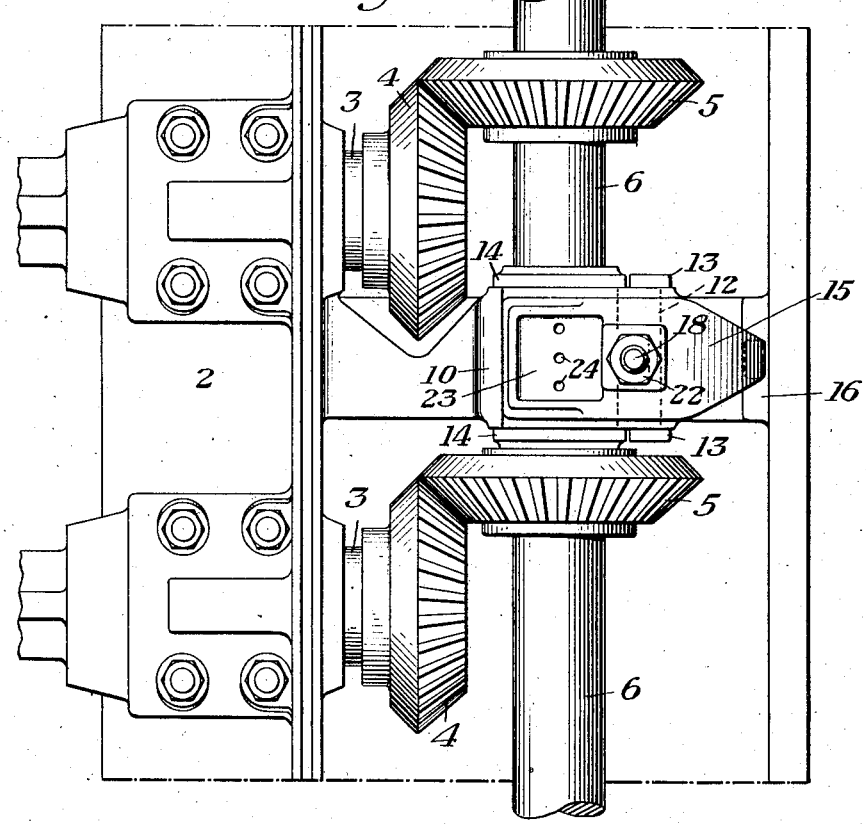
Figure 1 is a fragmentary plan view of a portion of a roller table.
Figure 4:
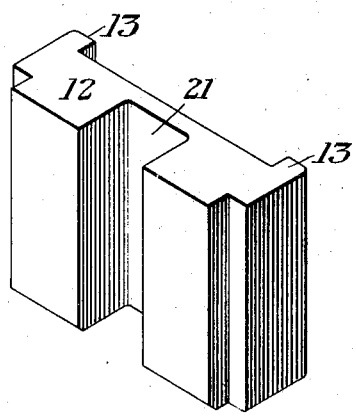
Figure 4 is a detail view of a filler block.

The line shaft is mounted in bearings supported by the table girder. Each bearing is divided horizontally to form a lower block 7 and an upper block 8, and the bearing rests upon a depressed seat 9. At one side of the bearing is a lateral wall 10, and at the opposite side a slotted lateral wall 11. A filler block 12, shown in detail in Figure 4, is placed between the bearing and the slotted wall 11 and maintains the bearing in engagement with the opposite lateral wall 10. The filler block is provided with flanges 13 at its opposite ends which engage vertical edges of the slotted wall 11 and prevent the filler block from moving longitudinally of the line shaft. The bearing is provided at its opposite ends with flanges 14 which engage vertical edges of the wall 10 and of the filler block and prevent the bearing from shifting longitudinally of the line shaft.

In order to hold the bearing upon its seat 9 and the filler block in position, a removable clamp 15 is provided. This clamp bears at one end upon a ledge 16 of the table beam, and at its other end bears upon the bearing through a half round 17. This half round has its flat side in engagement with the upper bearing block 8 and is held in a recess in the clamp. The clamp is held in operative position by a single bolt 18 which is formed with an eye portion 19 at its lower end, through which a pivot pin 20, positioned below the seat 9, passes. This bolt extends vertically through a slot 21 in the filler block 12, and passes through an opening in the clamp. The upper end of the bolt is screw threaded and has nuts 22 mounted thereon. When these nuts are tightened, the bearing is held firmly on its seat and the filler block 12 cannot be removed, since the clamp extends over the same. The clamp is positioned between the flanges 14 of the upper bearing block 8, and is prevented from shifting longitudinally of the line shaft thereby. It is prevented from shifting laterally by the walls 10 and 11.

The portion of the clamp 15 which overlies the bearing is recessed to provide a chamber 23 for supplying lubricant to the journal portion of the line shaft. This chamber feeds the lubricant to said journal portion through an opening 24 extending through the clamp, half round 17 and upper bearing block 8.

With the line shaft mounted in the manner above described, if it is desired to remove a table roller, the nuts 22 will be removed from the bolt 18 at each of the line shaft bearings, permitting the removal of the clamps 15 and filler blocks 12. The bolt 18 will then be swung through the slots of the walls 11 into the dotted line position shown in Figure 3. The line shaft 6 may then be shifted away from the center line of the roller table by an amount equal to the thickness of the filler blocks 12. This is a sufficient movement to unmesh the line shaft mitre gears from the roller mitre gears and permits the removal of any table roller.

In order to protect each bearing from dust, scale and the like, and same may be covered by a suitable hood 25 held in position on the table girder and adapted to be removed by simply lifting it off of the same.

The advantages of the invention will be apparent since it provides a mounting for the line shaft of a roller table which permits the shaft to be shifted away from the center line of the table upon the removal of a relatively small number of parts. Therefore, when a roller burns out, it is possible to disconnect the driving gear quickly and remove the burnt out roller. This mounting for the line shaft also permits the shaft to be readily removed from or assembled with the roller table.

While, as already pointed out, the invention is particularly useful in connection with the line shaft of a roller table, its use is not limited in this respect, as, in its broader aspects, the invention provides a convenient mounting for any kind of a rotating element where it is desirable to provide for a lateral shifting of such element. The term "shaft" employed in the specification and claims is a term of description and not of limitation, and is intended to include broadly the journal portion of any rotatable element.

It will be understood, of course, that the invention is not limited to the exact details and arrangement of parts shown, as many modifications may be made therein without departing from the spirit of the invention or scope of the appended claims.

I claim:

1. The combination with a shaft, of a support having a recess therein, open at its top, a bearing for said shaft mounted in said recess, a removable filler interposed between said bearing and a lateral wall of said recess whereby when said filler is removed said shaft can be shifted laterally, said filler having a vertical passage therethrough, a clamp extending over said filler and said bearing for holding them in position, and a bolt extending through said passage for holding said clamp in position, substantially as described.

2. The combination with a shaft, of a support having two normally open sides, a bearing for said shaft carried by said support, a removable filler constituting a closure for one of said normally open sides and serving to prevent lateral movement of said bearing when the same is in position, and a clamp adapted to cooperate with said bearing through said other open side and prevent removal of said filler, and fastening means for said clamp intermediate its extremities, said fastening means being mounted to swing into operative position in a plane intersecting the axis of the shaft, substantially as described.

3. The combination with a shaft, of a support having two normally open sides, a bearing for said shaft carried by said support, a removable filler constituting a closure for one of said normally open sides and serving to prevent lateral movement of said bearing when the same is in position, and a clamp adapted to cooperate with said bearing through said other open side and prevent removal of said filler, there being a fastening means for said clamp extending upwardly adjacent said bearing intermediate the same and said filler, substantially as described.

4. The combination with a shaft, of a support having a bearing support formed with one open side and one partially open side, a bearing carried by said support, a filler cooperating with said partially open side, a clamp cooperating with said open side, said clamp when in position preventing removal of said bearing and said filler, and fastening means movable outwardly through said partially open side when the filler is removed, substantially as described.

5. The combination with a shaft, of a support having one open side and one slotted side, a bearing on the support, a filler for said slotted side adapted to bear against said bearing, a clamp for said open side adapted to prevent removal of said filler, and fastening means for said clamp movable through the slot in said side, substantially as described.

6. The combination with a shaft, of a support having one open side and one slotted side, a bearing on the support, a filler for said slotted side adapted to bear against said bearing, a clamp for said open side adapted to prevent removal of said filler, and fastening means for said clamp movable through the slot in said side, there being a pivotal mounting for said fastening means on said support, substantially as described.

7. The combination with a shaft, of a support having a depressed seat therein, a bearing for said shaft mounted on said seat, a filler interposed between said bearing and a lateral wall of said support, a removable clamp engaging said bearing and extending over said filler for preventing removal thereof, a bolt pivoted at its lower end and extending vertically between said bearing and lateral wall and having its upper end screw threaded and extending through said clamp, and a nut mounted on said screw threaded end of said bolt and engaging said clamp, said lateral wall having a slot therein permitting said bolt to be swung laterally thereinto when said clamp and filler are removed, substantially as described.

8. The combination with a shaft, of a support having a depressed seat therein, a bearing for said shaft mounted on said seat, a filler interposed between said bearing and a lateral wall of said support, a half round engaging the top of said bearing with its flat side, and a clamp extending over said filler and bearing and having a recess receiving said half round, substantially as described.

9. In a mill table, the combination with table rollers and mitre gears mounted on the necks thereof, of a support having an open top recess therein, a line shaft, mitre gears mounted on said shaft and meshing with the mitre gears of said rollers, a bearing for said shaft mounted in said recess, a filler interposed between said bearing and a lateral wall of said recess, a removable clamp for holding said bearing and filler in position, and a single bolt for holding said clamp in position, substantially as described.

10. The combination with a shaft, of a support having a recess therein open at its top, a bearing for said shaft mounted in said recess, a removable filler interposed between said bearing and a lateral wall of said recess, whereby when said filler is removed said shaft can be shifted laterally, and a clamp extending over said filler and said bearing for holding them in position, said clamp having a chamber therein for holding lubricant, the clamp and bearing having a passage therein for conducting lubricant from said chamber to said shaft, substantially as described.

In testimony whereof I have hereunto set my hand.

LORENZ IVERSEN.